Aug. 6, 1940.  E. FITCH  2,210,286
END GATE LATCH
Filed Jan. 9, 1939
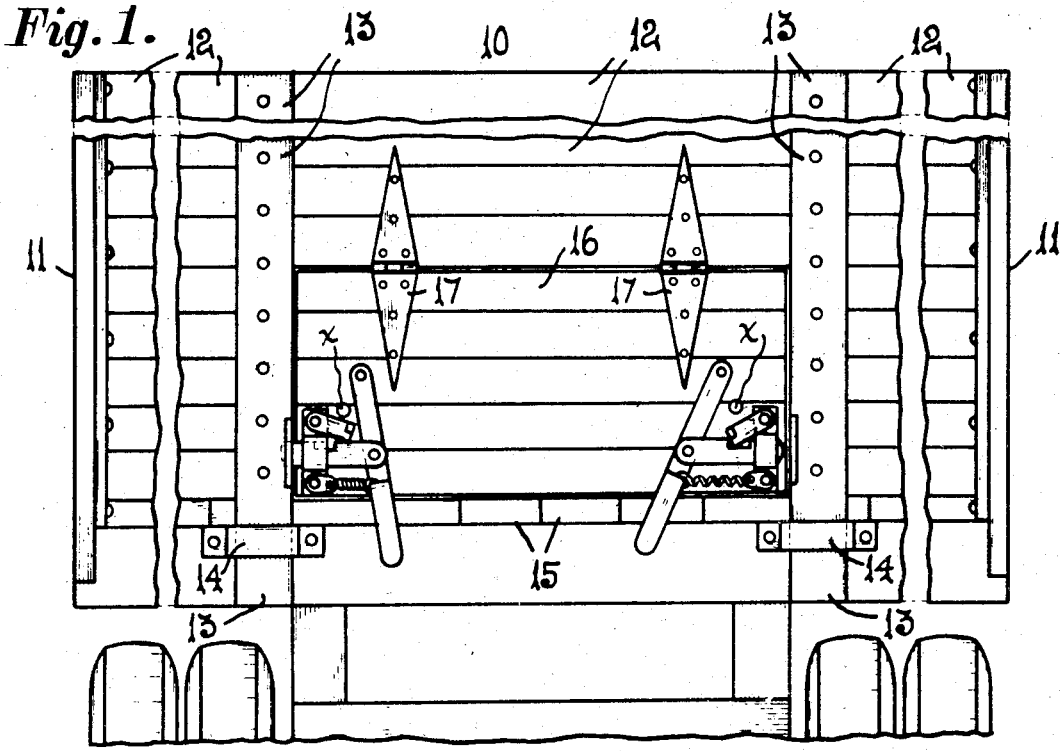
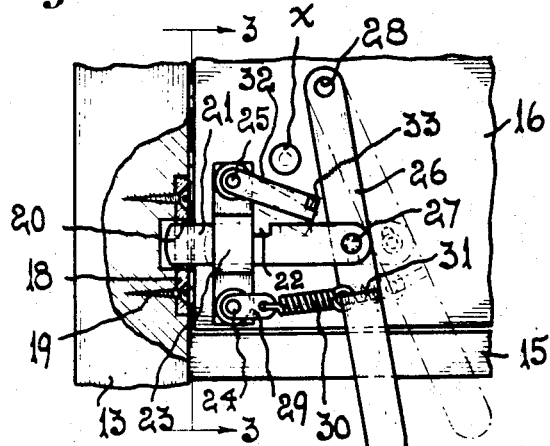
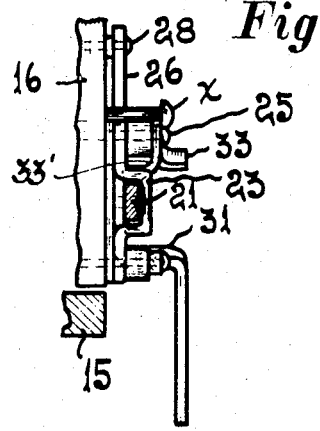
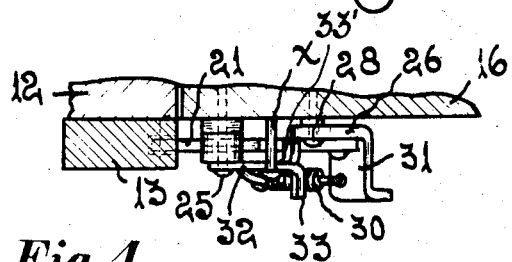
Inventor
Ellery Fitch
By Arthur H. Sturges
Attorney Patented Aug. 6, 1940

2,210,286

UNITED STATES PATENT OFFICE 2,210,286

ENDGATE LATCH

Ellery Fitch, Bogue, Kans.

Application January 9, 1939, Serial No. 249,912

2 Claims. (Cl. 292—173)

This invention relates to latches such as door latches and more particularly to truck and wagon endgate latches, and has for an object to provide a device of economical construction which is readily and easily operable for releasing an endgate of a wagon or the like at times when pressure is applied to the endgate thereof by means of loose grains, coal or the like merchandise within the wagon box and more particularly at times when one end of said box is elevated for causing the contents thereof to flow or roll outwardly through the gate.

Other and further objects and advantages of the invention will be understood from the following detailed description thereof, reference being had to the accompanying drawing in which:

Figure 1 is an end elevation of a truck cargo box or the like, certain portions thereof being broken away and having the new device applied thereto.

Figure 2 is an enlarged detail of one of the latches employed as applied to a fragment of a truck box and endgate.

Figure 3 is a view taken on line 3—3 of Figure 2.

Figure 4 is a top plan view of the latch shown in Figure 2.

Referring now to the drawing for a more particular description 10 indicates generally a cargo or wagon box having oppositely disposed side walls 11 and an end wall 12 which, as shown in Figure 1, is mounted on the chassis of a truck or the like. The end wall 12 includes stanchions 13 which removably extend through C-shaped brackets 14 secured to the body of the truck whereby at times when the side and end walls of the box are assembled together upon the floor 15 said box is adapted to transport coal, grain and the like. The box together with the floor 15 are adapted to be tilted upwardly at the forward end thereof in a well known manner by a means not shown for causing the contents of the box to flow through the endgate 16 of the end wall 12 at times when said gate is open. The gate 16 extends between the stanchions 13 and is vertically swingable upon its hinges 17 which are pivotally secured to the gate and to the end wall 12, said gate being normally closed.

The oppositely disposed stanchions 13 are each provided with a metal strike 18. As best shown in Figure 2, the strike 18 is preferably embedded in the stanchion and secured thereto by suitable screws or fastening means 19. The strike 18 is provided with a slot 20 for receiving an end therein of a slidable bolt 21.

The elongated bolt is rectangular in cross section and provided with a notch 22 at the upper edge thereof for purposes later described.

A bracket 23 having a substantially C-shaped central portion and oppositely extending flat attaching portions which receive stud bolts or like fastening means 24 and 25 by means of which the bracket is secured to the outer side of the end gate.

The bolt 21 is slidably disposed through the bracket 23 having an end which is pivotally connected between the ends of a lever 26 as at 27. One end of the lever 26 is pivotally secured as at 28 to the endgate 16, the other end of said lever being freely swingable whereby, at times when said free end of the lever is moved towards the stanchion 13, the latch bolt 21 is provided with a corresponding movement for engaging the bolt with the strike 18 for removably securing the endgate to the stanchion.

The stud bolt 24 carries a link 29 to which one end of a spring 30 is secured, the other end of said spring being attached to the off-set portion 31 of the lever 26 for normally urging the latch bolt 21 into engagement with the strike 18.

The stud bolt 25 provides a pivotal mounting for a swingable arm 32 which is maintained in parallelism with respect to the latch bolt. The free outer end of the arm 32 is provided with an out-turned handle portion 33 and an inturned portion 33' which is adapted to engage at times in the heretofore mentioned notch 22 of the latch bolt 21.

Referring to Figure 2, the normal position of the parts with respect to the stanchion and endgate is therein depicted and at times when the lever 26 is moved from the full line position to the dotted line position thereof shown in Figure 2 against the urge of the spring 30, the latch bolt 21 becomes withdrawn from engagement with the strike 18 and the endgate 16 released, and at this time the detent 33' drops by gravity into engagement with the walls of the notch 22 for maintaining the latch bolt 21 in a disengaged position with respect to the strike 19 and during the time the endgate 16 is in a released and open position for the discharge of cargo.

To return the endgate to a normal locked position said gate is swung downwardly and the detent 33' raised upwardly for releasing the latch bolt for an engagement with the strike 18.

At x is indicated a stop-pin which is secured to the endgate 16 and is outstanding with respect thereto for limiting the swing of the lever 26 toward the adjacent stanchion 13 and for the primary purpose of preventing the arm 32 from swinging upwardly too great a distance.

It will be understood that a latch like the one above described is provided at each side of the door 16 for truck box use and that the springs 38 maintain the bolts of said latches engaged with their respective adjacent stanchion during use and that during the vibration, shocks and jars, incident to road travel of the vehicle, said latches will maintain the endgate closed while at the same time said bolts may be readily retracted by the operator for releasing said endgate.

From the foregoing description it is thought to be obvious that a latch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

What is claimed is:

1. A device for the purpose described comprising a bracket and a lever respectively adapted to be rigidly and pivotally secured to an endgate, a bolt having an end pivotally attached to said lever and an opposite end slidably disposed through said bracket, said bolt being provided with a notched-portion between its said ends, a link secured to said bracket, a spring having one end secured to said link and its other end secured to said lever for urging the lever toward said bracket, a detent pivotally attached to said bracket, adapted to removably engage in said notch for holding said lever and bolt in a retracted position with respect to said bracket against the urge of said spring, and a stop-pin secured to the endgate and disposed in the path of the lever as the latter moves towards the bracket to limit its movement in that direction, said stop-pin also being disposed in the path of said detent as it moves to inoperative position to limit its movement in that direction.

2. A device for the purpose described comprising a bracket and a lever respectively adapted to be rigidly and pivotally secured to an endgate, a bolt having an end pivotally attached to said lever and an opposite end slidably disposed through said bracket, said bolt being provided with a notched-portion between its said ends, a spring secured between said lever and bracket for urging the lever toward said bracket, a detent pivotally attached to said bracket adapted to removably engage in said notch for holding said lever and bolt in a retracted position with respect to said bracket against the urge of said spring, and a stop pin secured to the endgate and disposed in the paths of the lever as the latter moves towards the bracket to limit its movement in that direction and of said detent as it moves to inoperative position to limit its movement in that direction.

ELLERY FITCH.